(12) United States Patent
McArdle et al.

(10) Patent No.: US 10,706,551 B2
(45) Date of Patent: Jul. 7, 2020

(54) OBJECT MOTION MAPPING USING PANCHROMATIC AND MULTISPECTRAL IMAGERY FROM SINGLE PASS ELECTRO-OPTICAL SATELLITE IMAGING SENSORS

(71) Applicant: 4DM Inc., Toronto (CA)

(72) Inventors: Steven McArdle, Toronto (CA); Trung Pham, Toronto (CA); Jian Yang, Toronto (CA); Mehdi Hosseini, Toronto (CA)

(*) Notice: Subject to any disclaimer, the term of this patent is extended or adjusted under 35 U.S.C. 154(b) by 160 days.

(21) Appl. No.: 15/939,800

(22) Filed: Mar. 29, 2018

(65) Prior Publication Data

US 2018/0286052 A1 Oct. 4, 2018

Related U.S. Application Data

(60) Provisional application No. 62/478,911, filed on Mar. 30, 2017.

(51) Int. Cl.
| | | |
|---|---|---|
| G06T 7/00 | (2017.01) | |
| G06T 7/13 | (2017.01) | |
| G06T 7/20 | (2017.01) | |
| G06T 7/246 | (2017.01) | |
| G06T 7/30 | (2017.01) | |

(52) U.S. Cl.
CPC ............ G06T 7/13 (2017.01); G06T 7/0002 (2013.01); G06T 7/20 (2013.01); G06T 7/246 (2017.01); G06T 7/30 (2017.01); G06T 2207/10036 (2013.01); G06T 2207/10041 (2013.01); G06T 2207/30168 (2013.01); G06T 2207/30184 (2013.01); G06T 2207/30236 (2013.01); G06T 2207/30241 (2013.01)

(58) Field of Classification Search
None
See application file for complete search history.

(56) References Cited

U.S. PATENT DOCUMENTS

| | | | | |
|---|---|---|---|---|
| 2005/0100220 | A1* | 5/2005 | Keaton | ............... G06K 9/0063 382/191 |
| 2008/0089558 | A1* | 4/2008 | Vadon | .................... G01C 11/06 382/113 |

OTHER PUBLICATIONS

Subash, "Automatic road extraction from satellite images using extended Kalman filtering and efficient particle filtering," International Journal of Distributed and Parallel Systems (Ijdps) vol. 2, No. 6, Nov. 2011 (Year: 2011).*
D'Orazio et al., "Archaeological trace extraction by a local directional active contour approach," Pattern Recognition 45 (2012) 34273438 (Year: 2012).*

(Continued)

*Primary Examiner* — Soo Shin
(74) *Attorney, Agent, or Firm* — Nasser Ashgriz; UIPatent Inc.

(57) ABSTRACT

The present invention is a semi-automated process to extract object motion and attributes from utilizing a remote sensing methodology using Earth Observation data from single pass satellite imagery. Many single pass satellite sensors collect imagery that include a panchromatic and multispectral image with a slight temporal offset. The method of the present invention performs image processing, object segmentation, object measurement, image normalization and image matching and velocity calculation to extract physical attributes of the object, object location, and object motion.

19 Claims, 13 Drawing Sheets

(56) References Cited

OTHER PUBLICATIONS

Liu et al., "A new segmentaito method for very high resolution imagery using spectral and morphological information," Isprs Journal of Photogrammetry and Remote Sensing 101 (2015) 145-162 (Year: 2015).*

Hormese et al., "Automated Road Extraction From High Resolution Satellite Images," Procedia Technology 24 (2016) 1460-1467 Year: 2016).*

* cited by examiner

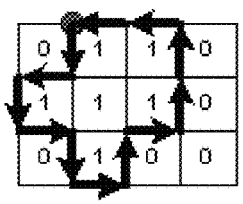
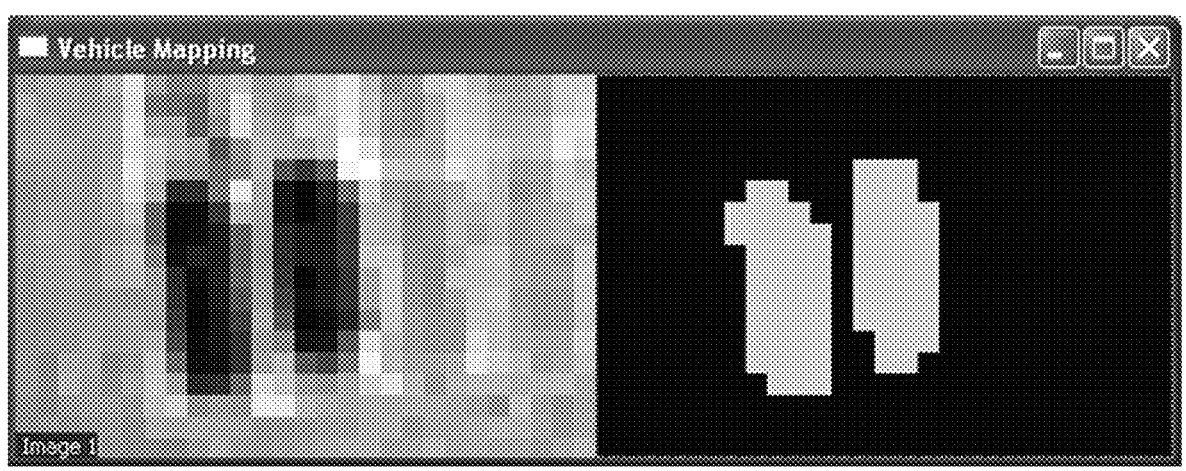
FIG. 5

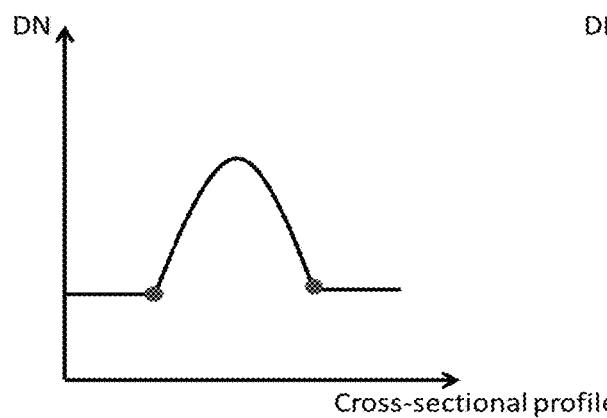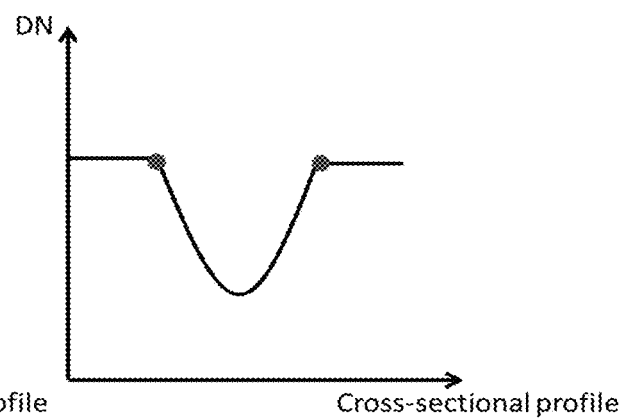
FIG. 12A  FIG. 12B

OBJECT MOTION MAPPING USING PANCHROMATIC AND MULTISPECTRAL IMAGERY FROM SINGLE PASS ELECTRO-OPTICAL SATELLITE IMAGING SENSORS

FIELD OF THE INVENTION

The present invention relates generally to optical remote sensing through the use of earth observation data acquired from single-pass satellite sensors with application of image processing technique, for the extraction of object attributes comprising position, shape, size, colour, and motion detection, both speed and trajectory, to uniquely identify the object and its behavior.

BACKGROUND OF THE INVENTION

Single-pass satellite sensors that acquire panchromatic and multispectral images have many applications. Image acquisition and numerical analysis techniques can provide the ability for remote global monitoring of objects, such as cars, boats, airplanes, and their behavior, such as location, speed and trajectory, as well as their physical properties such as their shape, size and colour that can be used for identification, without a need of hardware solution. The information about objects acquired from single-pass satellite imagery provides geographic coverage in the spatial domain at an instant in time and can be acquired at sub-daily frequency from current single-pass satellite sensor as part of a constellation of sensors. The present invention allows the use of commercially available single-pass satellite imagery for global access for tracking, uniquely identifying and mapping objects from new image acquisition to historical archive data.

Single pass satellite imagery has been used for transportation planning, urban mapping, and maritime surveillance to name a few. Object motion mapping has been applied for vehicle extraction to provide traffic pattern information along transportation corridors and the development of spatial traffic congestion index accounting for vehicle motion, type, density, count and proximity for smart city applications. Other applications of Object Motion Mapping include Maritime Domain Awareness providing vessel tracking and identification of "Dark Targets", Automated Information System (AIS) verification on vessels and coastal surveillance.

The prior art systems to determine movements of objects such as vehicles from optical images require two images separated by a short time interval, otherwise it is not possible to recognize the object displacement. The challenge with extracting the motion of an object and the attributes of the object is the ability to accurately delineate the object and to automate the process to suppress background noise, such as shadow or boat wash and accurately extract information.

If a method can be developed to extract motion information from currently available single-pass satellite imagery, new data can be extracted from the images. There is a wealth of satellite images, which have both historical values and also can be used to develop data base for future transportation planning, national security interest, economic assessment and other application.

SUMMARY OF THE INVENTION

The present invention is a semi-automated method to extract object motion and physical attributes using Earth Observation data from single-pass satellite imagery. Such imagery is generally acquired through electro-optical sensors collecting imagery in spectral band across the visible to near-infrared part of the electromagnetic spectrum. Single-pass satellite imagery using pushbroom, frame and whiskbroom sensors can collect a panchromatic and multispectral image with slight temporal offset. The method of the present invention is implemented in a sequence of processes involving image processing, to conduct a sequence of automated routines that comprise of image registration, object segmentation, object measurement, image normalization, image matching, velocity calculation and quality flags to extract physical attributes of the object (e.g., size, shape, compactness and colour), as well as object's location (e.g., geographic coordinate) and motion (e.g., speed and direction/heading/trajectory).

The invention leverages the timing difference associated with pushbroom, frame and whiskbroom electro-optical sensors when separately acquiring panchromatic image and multispectral image. The temporal delay in acquiring the images results in spatial displacement due to the movement of the object. A shift of the object results in a displacement distance with respect to position and/or orientation as describe by a trajectory vector. However, the multispectral image resolution is typically 3 to 4 times lower than the panchromatic image, presenting a unique challenge to automatically identify same object in both image scene. In addition, panchromatic image is a monochromatic greyscale image, whereas the multispectral imagery is combination of multiple spectral bands at different wavelengths in visible to near-infrared and can be combined to create a colour image, and therefore, the object looks different. To address the difference in appearance a process is used to creates a simulated panchromatic image from the multispectral data to normalize the images using a dynamic regression model. The original panchromatic and simulated panchromatic images (OPI, SPI) are used in the image matching process to identify and extract the object's displacement information and then calculate the velocity.

The present invention is a semi-automated method to extract a set of object parameters that consists of motion and physical attributes to uniquely identify the object from a single-pass satellite imagery that provides a panchromatic (PAN) image and a multispectral (MS) image with a temporal offset, the method comprising two steps and set of sub-steps:

a. Step 1: manually identifying two seed points on the image at the front and the back of the object, b. Step 2: then in automated manner a sequence of processes or substeps are conducted that include the following steps:
  i. performing an image registration;
  ii. perform object segmentation comprising of the following steps of:
    1. Using the seed points to enable an object profile as the line connecting the front and the back seed points, and identifying the object centroid as being the middle point of the profile,
    2. Then enable perpendicular profiles to object profile in mesh like structure extending across and beyond the object,
    3. Using the profiles to detect the edges of the object by predicting set of edge pixels,
    4. removing a set of noise pixels, and
    5. refining the object edges by refining the edge pixels;

6. then infilling to create the complete edge shape or perimeter of the object.

iii. performing an image normalization to resample the multispectral image to create a Simulated Panchromatic Image (SPI) that matches the Panchromatic image (PAN) now referred to as the Original Panchromatic Image (OPI) by performing a rescaling and a dynamic regression analysis to determine the gray scale coefficient values for creating the SPI;

iv. The intelligently select and clip OPI and SPI for image matching v. performing an image matching between OPI and spatially displaced SPI at the coincident location of the object, and apply a point matching of a set of target pixels in the OPI to extract the same corresponding pixels in the SPI;

vi. determining the speed and trajectory of the object by calculating the displacement of the set of target pixels, vii. performing an image quality testing, wherein a set of similarity measurements are performed on the profile and the segmentation.

In the present invention the image registration is performed using a Rational Functional Model (RFM) camera model, wherein the RFM is the ratio of two cubic functions of latitude, longitude, and height that provide the conjugate image coordinate. The RFM is refined with a set of ground control points (GCP) using a Bias Compensation method in an image space.

In the present invention the edge pixels are detected using a spectral intensity gradient method for a set of ordered pixels along the cross-sectional profiles, and wherein a gradient is derived for each of the set of cross-sectional profiles around outer edge of the object, and wherein at least two pixels with a maximum and a minimum gradient are considered as a pair of raw edge pixels.

The present system can be used by shipping companies for fleet monitoring, conservation organization for fishing monitoring, companies providing traffic information, national defense/military for coastal surveillance, transportation department for traffic patterns, corporations for infrastructure surveillance, border security, remote airport monitoring and others.

One object of the present invention is to develop a system that can provide a rapid analysis of satellite images to obtain information on moving objects such as vehicle, vessel and aircraft. The present invention provides a semi-automated means of deriving information about objects attributes, count and density, for example, land vehicles such as cars on a highway, maritime vessels in port area, and aircraft.

Another object of the present invention is to reduce the amount of time and effort needed to extract object information for use in surveillance, transportation planning, national defence, strategic asset monitoring, and environmental protection (monitoring of fishing vessels).

Another object of the present invention is to obtain a moving vehicle's attributes from a set of still images, rather than video cameras. The prior art methods using images from video cameras to detect vehicle motion are site specific with limited range of monitoring objects in motion over large geographic regions unlike using satellite imagery systems, which provide wide area coverage.

Another object of the present system to use only a single pass satellite image from optical data to extract object movement and attributes.

Another object of the present system is to use high resolution imagery to allow extracting smaller objects and more detailed attributes, such as shape, size and colour information to assist in uniquely identifying the object.

Another object of the present system is to make the system applicable to a wide range of images provided by different commercial satellite providers.

Another object of the present system is retaining the information extracted into a database file with unique identification to "fingerprint" the object for object recognition by developing a new set of data for verification and tracking using new and/or historical images.

Another object of the present system is to provide global access to all users of satellite imagery without any need for extra hardware, licenses or approval to obtain accurate identification of object motion with low cost, and without any need for using airplanes and boats for verification, and complimentary with other data source such a SAR imagery for surveillance and AIS data.

BRIEF DESCRIPTION OF THE DRAWINGS

Embodiments herein will hereinafter be described in conjunction with the appended drawings provided to illustrate and not to limit the scope of the claims, wherein like designations denote like elements:

FIG. 5 illustrates the object measurement method using a chaincode.

FIG. 12A illustrates the selection of edge pixels in the segmentation when the object is brighter than the surrounding.

FIG. 12B illustrates the selection of edge pixels in the segmentation when the object is darker than the surrounding.

DETAILED DESCRIPTION OF PREFERRED EMBODIMENTS

The figures are not intended to be exhaustive or to limit the present invention to the precise form disclosed. It should be understood that the invention can be practiced with modification and alteration, and that the disclosed technology be limited only by the claims and equivalents thereof.

The technology disclosed herein, in accordance with one or more various embodiments, is described in detail with reference to the following figures. The drawings are provided for purposes of illustration only and merely depict typical or example embodiments of the disclosed technology. These drawings are provided to facilitate the reader's understanding of the disclosed technology and shall not be considered limiting of the breadth, scope, or applicability thereof. It should be noted that for clarity and ease of illustration these drawings are not necessarily made to scale.

The present invention provides object motion mapping using satellite imaging. Object Motion Mapping (OMM) is a system utilizing processes that extracts speed, trajectory, size, shape, colour, and position of an object using a single pass optical Earth Observation data. The algorithms utilize temporal differences in the panchromatic and multispectral images to detect the motion of objects. Image resolution between panchromatic and multispectral is typically about 3 to 4 times degraded. In the present imaging system, a semi-automated process using manually extracted seed points and default parameters are used to identify the characteristics of an object.

Figure 1:
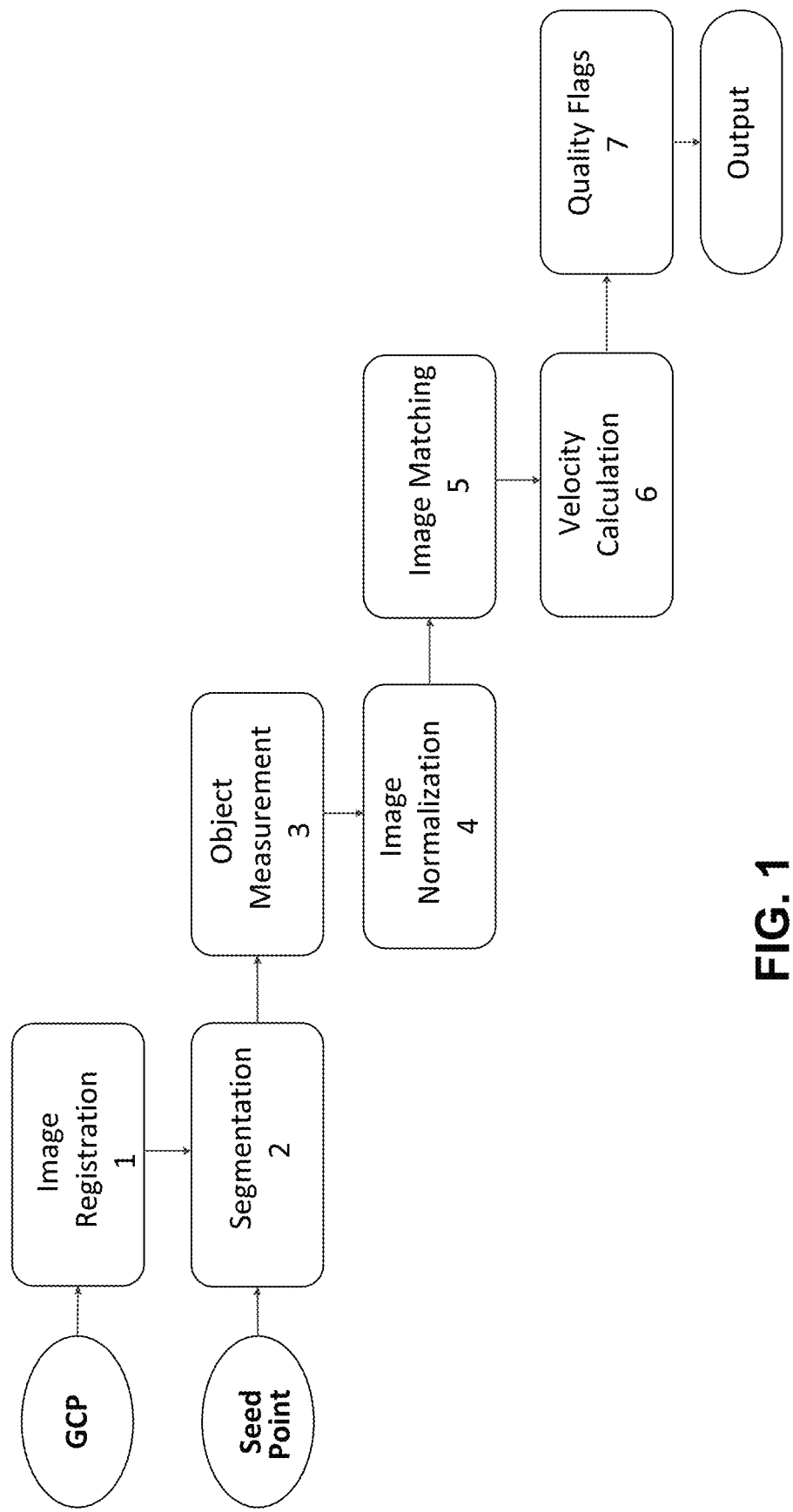
FIG. 1 illustrates the processes performed to extract object attributes.

The present object motion mapping system comprises of the following subsystems, as represented in FIG. 1: (i) Image registration 1, (ii) Object segmentation 2, (iii) Object measurement 3 (iv) Image normalization 4, (v) Image matching 5, (vi) Velocity calculation 6, and (vii) Quality flag 7.

(i) Image Registration: Image registration is performed using a Rational Functional Model (RFM) as a generic sensor model and applying Rational Polynomial Coefficient (RPC) provided by satellite vendor to georeferenced the images from frame and pushbroom sensor, cameras and scanners. RFM is the ratio of two cubic functions of latitude, longitude, and height that provide the conjugate image coordinate. RFM can be refined with ground control points (GCP). It can be refined in the image space (Bias method) or in the object space (Generic method). For high resolution satellite images, both approaches can achieve equivalent accuracy. However, the Bias compensation method is simpler than the Generic method. Therefore, the Bias method, is a preferred method to refine the camera model.

(ii) Image segmentation: Image segmentation comprises of steps of (1) identifying a set of seed points; (2) detecting the edges of the object, (3) suppressing the noise in the detected points and (4) refining and filling in the edges.

Figure 2:
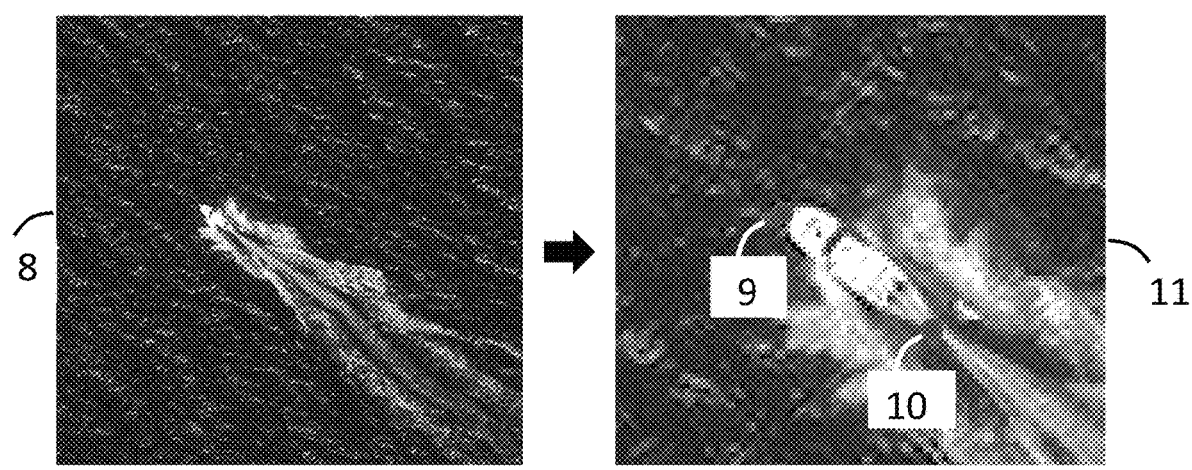
FIG. 2 illustrates the identification of seed points, one at the front and one at the back of a vessel.

Image segmentation is exemplified in one embodiment of the present system for identifying ships, vehicles, aircraft, and/or objects, as illustrated in FIG. 2. Once PAN image 8 is registered, at least two seed points, one at the front 9 and one at the back 10 of the object are manually identified on the registered image 11.

Figure 3:
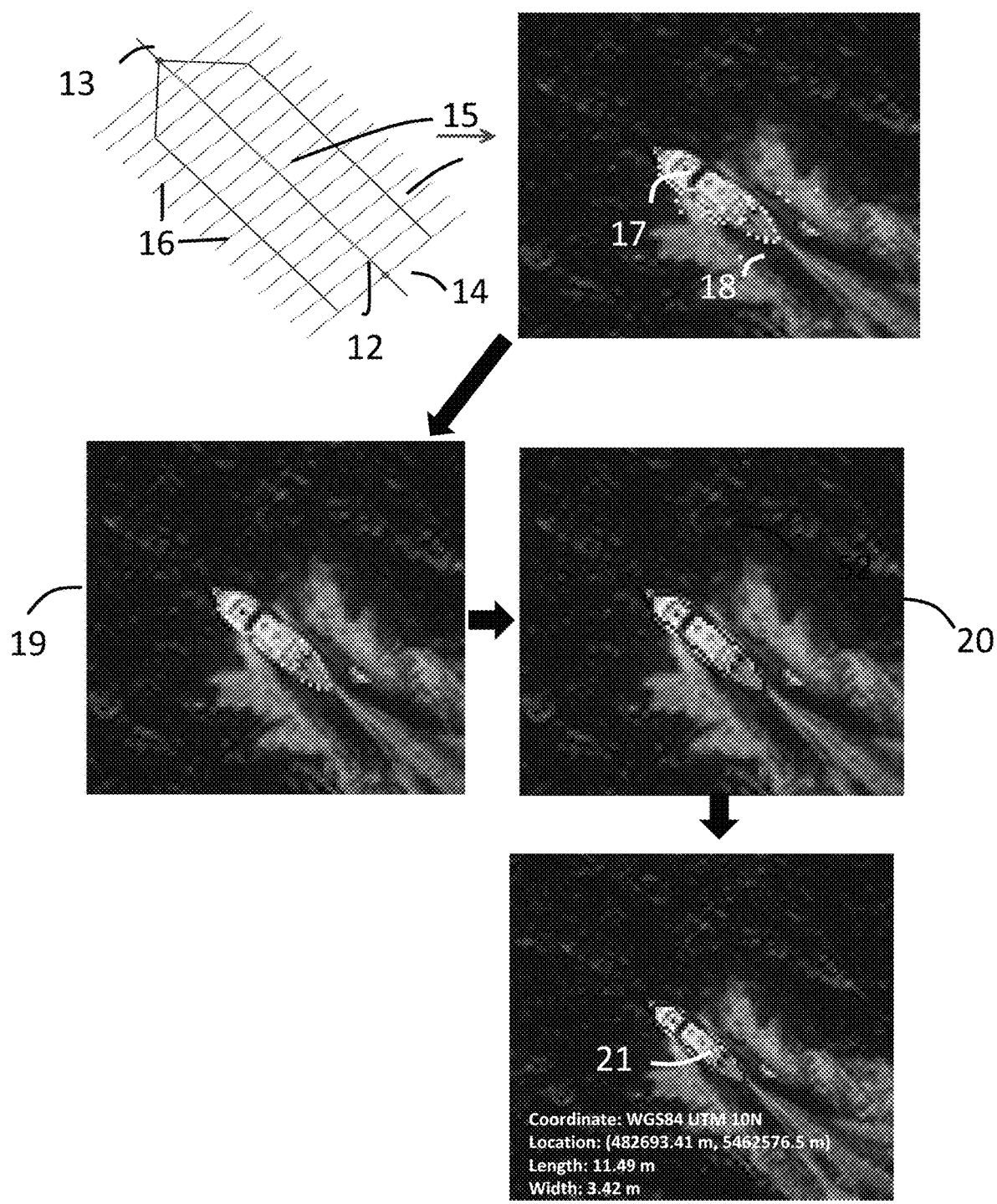
FIG. 3 illustrates object segmentation process using gradient method. The boundary of the target object (i.e., ship) is segmented. Two dots, represent the manually identified front and back points of the object. The central line represents the profile along the long side of the ship, while the cross lines represent the cross-sectional profiles perpendicular to the profile. Finally, elimination of noisy edge points and refinement and determination of the object edges are illustrated.
Figure 4:
FIG. 4 is an example of image segmentation next to an adjacent vessel.

A segmentation method is used to segment the object and refine the edge pixels at each segments of the object within the image. The segmentation method in the present system has the following steps: First the seed point profile of the object is identified as being the line 12 connecting the front 13 and the back 14 seed points, as illustrated in FIG. 3. Then, the center of the object is identified as being the center of the profile 15. At a set interval, perpendicular lines are generated along the seed profile line 12 to create a line mesh over the object 16. The segmentation centroid is automatically calculated from our object measurement algorithm. Then the edges of the object 17 are identified based on an edge detection algorithm. Since there may be anomaly pixels 18, a noise suppression algorithm is used to eliminate the anomaly pixels to generate a clean image of the object 19. The edge pixels are then refined to generate a more clear and refined edges of the object 20. The finalized image 21 provides the shape of the object together with its centroid, coordinates, location, as well as its length, area and width. FIG. 4 shows the effectiveness of the segmentation process with the ability to extract the vessel of interest and not the adjacent vessel.

Object Measurement: The Noise Suppressed Raster Binary Image from the segmentation process is used to calculate objects dimensions including area, perimeter, centroid, minimum bounding box, compactness, colour, longest chord, longest perpendicular cord and elongation. Using the binary image object contouring is conducted. Contouring is done by select 4 or 8 directional boundary searches is applied as shown in FIG. 5. Search is conducted for first boundary using a chain code process based to detect the boundary based on Miszalok algorithm. The area is used to extract the colour information from the object in resampled MS image based to extract the spectral signature (mean, maximum, minimum and median), histogram distribution of spectral intensity band, and colour statistics.

Figure 6:
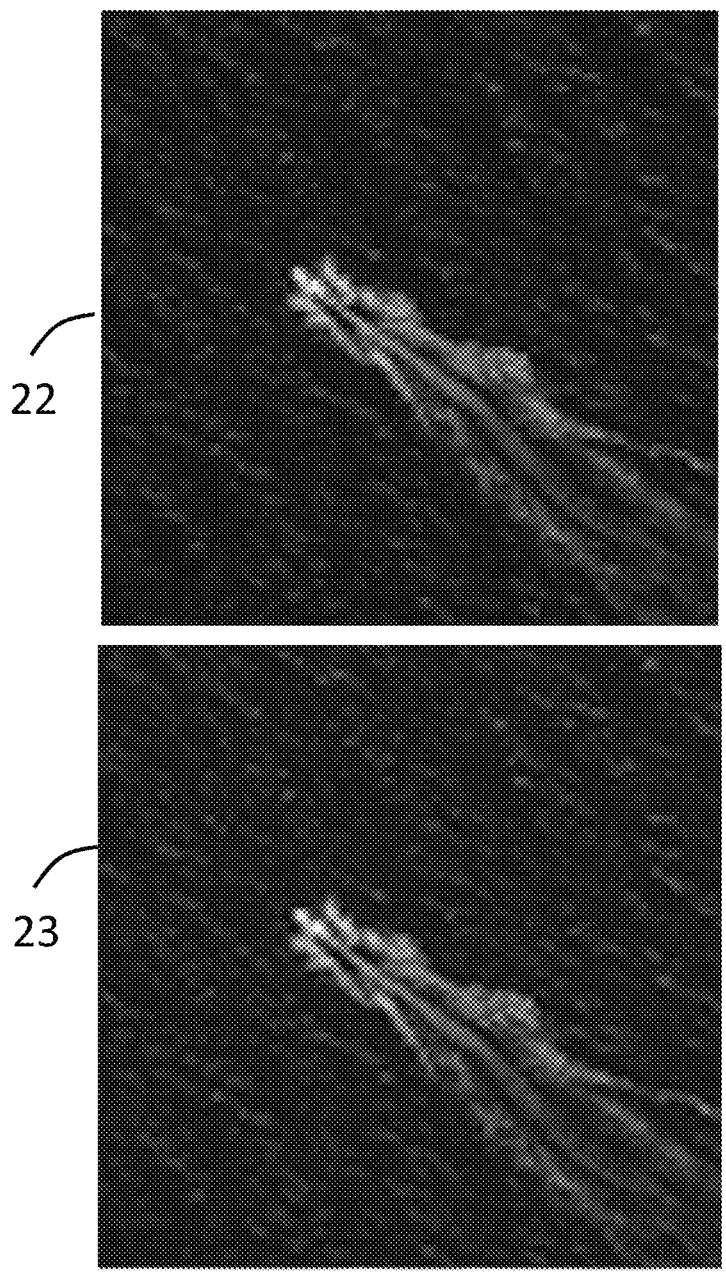
FIG. 6 illustrates the resampled multispectral image and a simulated panchromatic image (SPI) obtained from the MS image.

Image Normalization: An image sampling of the panchromatic and multispectral image at the same location is done. A resample multispectral image 22 is used to create a Simulated Panchromatic Image (SPI) 23, as illustrated in FIG. 6. A dynamic regression model is used to determine the gray scale coefficient values.

Figure 7:
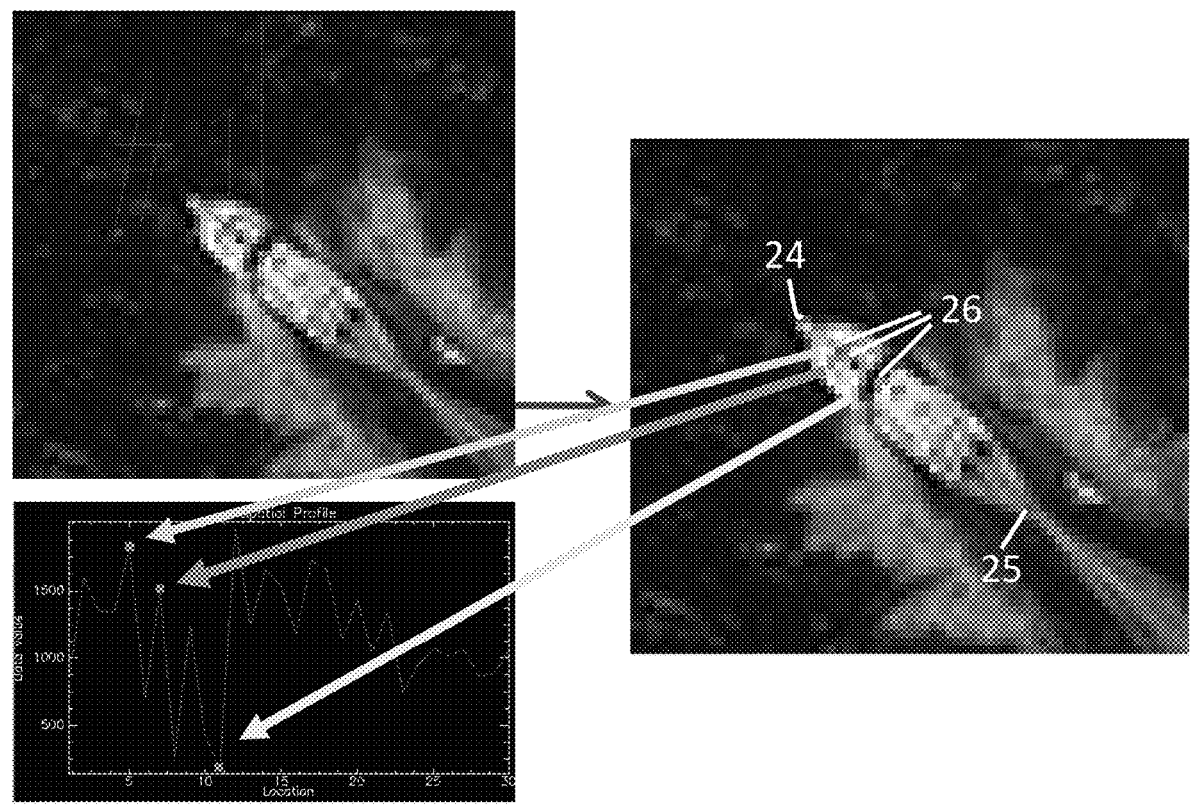
FIG. 7 illustrates utilization of object profile to select additional target points.
Figure 8:
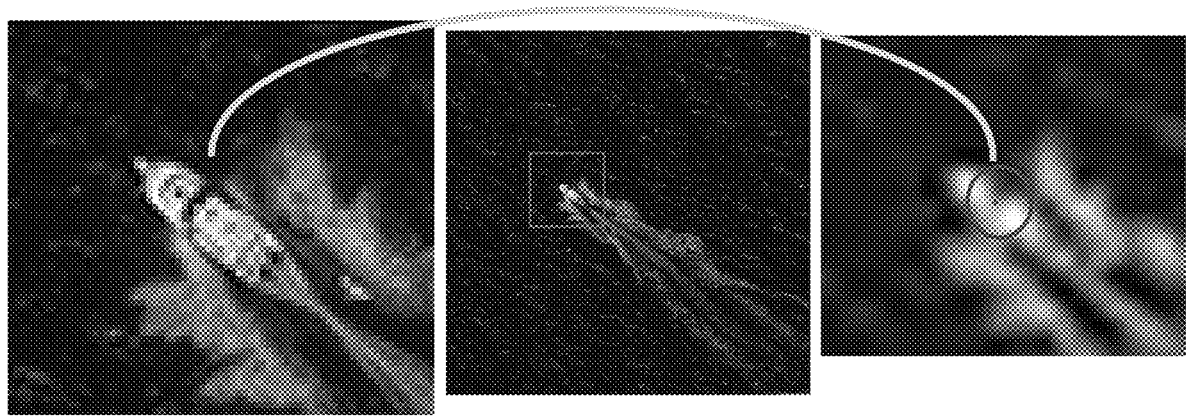
FIG. 8 illustrates pixel matching between the PAN and MS images.
Figure 9:
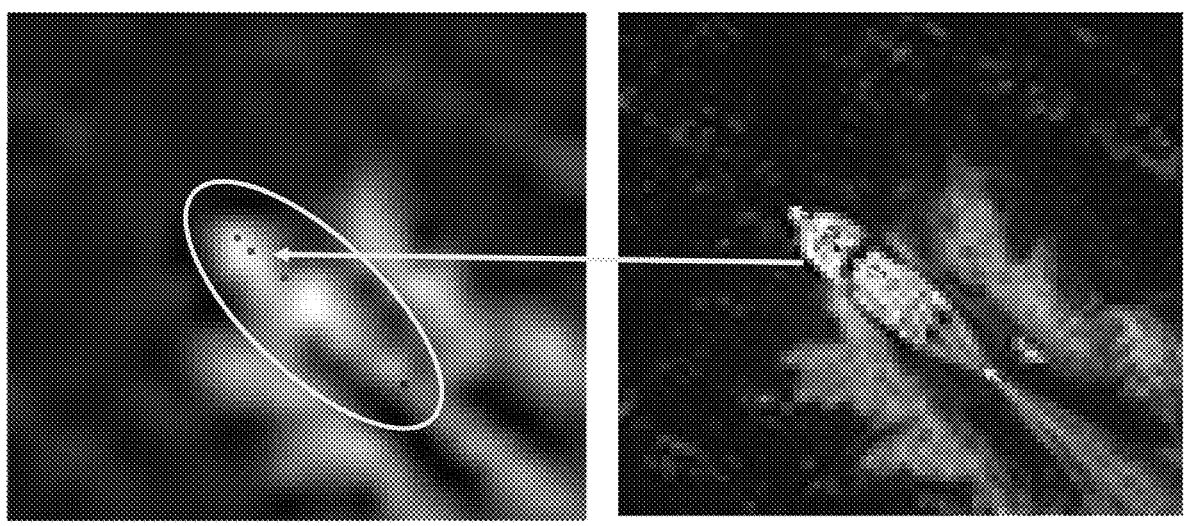
FIG. 9 illustrates determination of object motion based on comparing the PAN and MS data.

Image Matching: Next is to determine the location of moving target pixels by implementing a multi-scale maximum cross-correlation method (MMCC). A set of target pixels are selected in the PAN image, and a hybrid method is applied to automatically extract the corresponding pixels in the SPI image based on local similarity and using multiple scale window sizes. The target pixels can be any number of pixels. FIG. 7 shows 5 pixels in the PAN, the front 24 and back 25 pixels, plus 3 pixels shown by 26 on the seed point profile line 12 in FIG. 3. Then the corresponding selected pixels are identified in the SPI image as illustrated in FIG. 8. For the following image matching, the system produces five target pixels along the profile derived from seed points. In order to make the selected target pixels spatially and spectrally distinct, the system chooses the pixels with the highest values of gradients along the seed point profile in addition to the user-defined two seed pixels, as illustrated in FIG. 7 and identified in the SPI as illustrated in FIG. 9.

Figure 10:
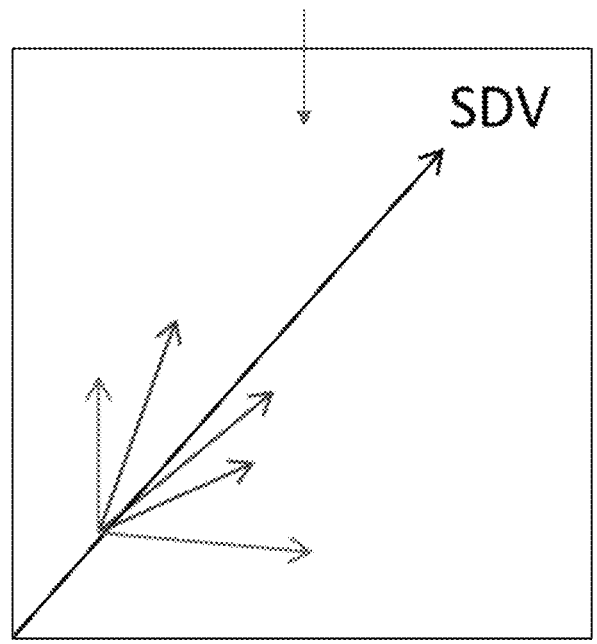
FIG. 10 illustrates the object velocity calculation method.

Displacement and Velocity: The present system then computes the displacement of the target pixels (5 pixels in FIG. 9). Velocity (speed and trajectory) is calculated using a scalar method first and then a vector base method if the scalar cannot be computed. A Scalar Velocity calculation method is used to calculate the angle between the object direction (e.g., Object Direction Vector, ODV in FIG. 10) and the target pixel displacement vector. A threshold is then applied to eliminate the target pixels, which result in trajectories out of the reasonable range. The system selects the best target pixel from the remaining target pixels using statistical comparison of the angles. The speed and trajectory are then calculated. In case where target pixels are not usable, a Vector Velocity Method is used based on the centroid of the pixel to calculate the speed and trajectory.

Quality Flags: The system then performs an image similarity analysis to assess the similarity of OPI and SPI. Another measure considers the displacement between the profile and the segmentation derived centroid from object measurement. The lower the displacement is the goal. In addition, a cross-correlation value is also provided The details of the methods used in the present system are described next.

Image Registration—The Bias Compensation Method: The Bias Compensation method calculates the bias compensation in the image space. For this analysis at least one ground control point is needed. The ground coordinates of the GCPs are used to calculate the image position through RFM model. The calculated image position can be different from what is measured on the image. This difference is used to determine the bias compensation by a least square solution. The bias compensation can be a linear function of the image coordinates or non-linear function of the image coordinates or just a shift. Once the bias compensation is determined, the RFM can be updated.

$$I = \frac{P_1(X, Y, H)}{P_2(X, Y, H)} + \Delta I \quad (1a)$$

$$J = \frac{P_3(X, Y, H)}{P_4(X, Y, H)} + \Delta J \quad (1b)$$

$$\Delta I = a_0 + a_1 * I + a_2 * J \quad (2a)$$

$$\Delta J = b_0 + b_1 * I + b_2 * J \quad (2b)$$

Methodology of Bias Compensation method: (1) Assume that there are n GCPs (X1, Y1, H1, I1, J1), (X2, Y2, H2, I2, J2), (X3, Y3, H3, I3, J3), . . . , (Xn, Yn, Hn, In, Jn). By using the camera model RPC, the image coordinates of each GCP based on its ground coordinates are calculated. Then the difference between the known image coordinates and calculated image coordinates can be determined as follow: $\Delta I_1 = I_1' - I_1$, $\Delta J_1 = J_1' - J_1$, $\Delta I_2 = I_2' - I_2$, $\Delta J_2 = J_2' - J_2$, $\Delta I_3 = I_3' - I_3$, $\Delta J_3 = J_3' - J_3$ . . . , $\Delta I_n = I_n' - I_n$, $\Delta J_n = J_n' - J_n$. (2) According to equation (2), for each GCP, two equations can be obtained. (3) If 6 or more equations are available, the 6 parameters a0, a1, a2, b0, b1, b2 can be determined by least squares solution: $a_0 + a_1 * I + a_2 * J - \Delta I = 0$, and $b_0 + b_1 * I + b_2 * J - \Delta J = 0$, or generally: BX+W=0, where $$B = \begin{bmatrix} 1 & I_1 & J_1 & & & \\ & & & 1 & I_1 & J_1 \\ 1 & I_2 & J_2 & & & \\ & & & 1 & I_2 & J_2 \\ 1 & I_3 & J_3 & & & \\ & & & 1 & I_3 & J_3 \\ \ldots & \ldots & \ldots & \ldots & \ldots & \ldots \\ 1 & I_n & J_n & & & \\ & & & 1 & I_n & J_n \end{bmatrix}$$

$$X = \begin{bmatrix} a_0 \\ a_1 \\ a_2 \\ b_0 \\ b_1 \\ b_2 \end{bmatrix} \quad W = \begin{bmatrix} W_{I_1} \\ W_{J_1} \\ W_{I_2} \\ W_{J_2} \\ W_{I_3} \\ W_{J_3} \\ \ldots \\ W_{I_n} \\ W_{J_n} \end{bmatrix} = \begin{bmatrix} -\Delta I_1 \\ -\Delta J_1 \\ -\Delta I_2 \\ -\Delta J_2 \\ -\Delta I_3 \\ -\Delta J_3 \\ \ldots \\ -\Delta I_n \\ -\Delta J_n \end{bmatrix}$$

Object Segmentation: In order to detect the raw edge pixels in segmentation process in FIG. 3, the following steps are taken and explain more detail: (i) User-defines two seed pixels: To determine the location and direction of a target object (e.g., a ship), its front 9 and back 10 pixels (the dots in FIG. 2) are identified by a user and are input into the system. Let these points be defined as (x1, y1) and (x2, y2). (ii) Derivation of the equation of the profile line: As shown in FIG. 3, the seed point profile of this target ship (the central line 12) is determined by the front (x1, y1) and the back pixels (x2, y2). It is a segment with a slope (slop-profile) and an intercept (intercept-profile):

$$(\text{slop-profile}) = \frac{y2 - y1}{x2 - x1}$$

intercept-profile = $y2 - x2 \times (\text{slope-profile})$

Derivation of line equations of cross-sectional profiles 16: As cross-sectional profiles (the cross lines 16 in FIG. 3.) are perpendicular to the profile (central line 12) between the front (x1, y1) and back pixels (x2, y2), the slope of the cross-sectional profiles (slop-crossp) satisfies the following equation if the profile is not vertical or horizontal: (slop–crossp)× (slop–profile)=–1. Such that $$(\text{slop-}crossp) = \frac{x2 - x1}{y1 - y2}.$$

To determine the line equation of each cross-sectional profile (cross lines in FIG. 3), its central pixel along the profile (central line in FIG. 3), in addition to the slope, namely (xc, yc), are identified so that the intercept of a cross-sectional profile line (intercept-crosspc) is: intercept–crosspc=yc–xc× (slop–crossp). In order to ensure the continuity of central pixels, if slop-profile is not greater than one, the step is moving along X direction, otherwise along Y direction. For example, when slop-profile is not greater than one, the method obtains the central pixels along the profile by adjusting xc from x1 to x2 (x1, x2 not included) by the step of one, then yc can be calculated by the line equation of profile:

yc=INTEGER[(slop–profile)×xc+(intercept–profile)+ offset]

In the above equation, offset is used to locate the pixel when rounding the coordinates to integer, such as 1.4→1; 1.6→2. On the other hand, when slop-profile is greater than one, the method obtains the central pixels along the profile by adjusting yc from y1 to y2 (y1, y2 not included) by the step of one, then xc can be calculated by the line equation of profile:

xc=INTEGER[(yc–(intercept–profile))/(slop–profile)+offset]

Each cross-sectional profile is determined by the slope (slop-crossp) and its central pixel (xc,). For each cross-sectional profile, all of the pixels along this cross-sectional profile within a specific length are found. For most vessels, the lengths of the cross-sectional profiles are usually less than 50 meters, since most of the target ships are not wider than 50 meters. Similar to the process of central pixel identification, one-pixel step moving is implemented along X or Y direction based on the value of slop-crossp. But differently, the moving along the cross-sectional profile starts from its central pixel (xc, yc) to two opposite directions. Thus, the method obtains the pixels along the cross-sectional profile as long as their distances to the central pixel (xc, yc) are less than 25 meters (two directions so 50/2=25). For example, when slop-crossp is not greater than one, the method adjusts the x-coordinate from xc to xc−1, xc−2 . . . , and to xc+1, xc+2 . . . (xc included), then y-coordinate can be calculated by the line equation of this cross-sectional profile:

$$y=\text{INTEGER}((\text{slop-crossp}\times x+(\text{intercept-crosspc})+\text{offset})$$

On the other hand, when slop-crossp is greater than one, the method adjusts the y-coordinate from yc to y−c1, yc−2 . . . , and to yc+1, yc+2 . . . (yc included), then x-coordinate can be calculated by the line equation of this cross-sectional profile:

$$x=\text{INTEGER}[(y-(\text{intercept-crosspc}))/(\text{slop-crossp})+\text{offset})$$

The pixels along each cross-sectional profile are further ordered by x-coordinate.

Edge pixel detection using gradient method: Given the ordered pixels along a cross-sectional profile, the gradient is derived for the cross-sectional profile. Specifically, the gradient value of a pixel (I) on the cross-sectional profile is calculated by subtracting its digital number ($DN_i$) to the DN value of its former pixel (i− 1), as denoted by:

$$\text{gradient}_i=DN_i-DN_{i-1}$$

In this algorithm, two pixels with maximum and minimum gradient are considered as the pair of raw edge pixels. This illustrated in FIG. 3.

Elimination of noisy edge pixels: The system calculates the mean distance (MEAN) and standard deviation (SD) of all the detected raw edge pixels to the profile (central line in FIG. 3.). If the distance of a raw edge pixel to the line is larger than "MEAN+1.5SD", this pixel is considered as an outlier of the target ship and is removed. The users can adjust this distance threshold to "MEAN+2SD" if several useful edge pixels are unexpectedly removed or to "MEAN+ 1/0.5/0SD" if more outliers are still remaining.

Convex Hull Extraction: After the removal of outlier edge pixels, the system extracts the convex hull by the Graham's scan to eliminate noisy edge points inside, as illustrated in FIG. 3. Find Pixels Between Points: Then, the system connects any adjacent two edge pixels on the convex hull to sketch the boundary of target object. To ensure the continuity of the ship boundary, one-pixel step moving is implemented along X or Y direction based on the slope determined by these two pixels.

Convex Hull Filling and Smoothing: Finally, the system fills and smoothes the convex hull by closing operator (first dilation then erosion) to create the "Noise Suppressed Raster Binary Image" of all edge pixels as shown in FIG. 3.20 and FIG. 4.

Object Measurement: The objects can be detected when the boundary, area, perimeter, centroid, bounding box, compactness are calculated. The steps for detecting objects are as follows: Step 1: image segmentation. Step 2: threshold the image. Step 3: detect 2D object boundary. Step 4: calculate object information such as area, perimeter, longest chord, longest perpendicular, min bounding box, centroid, compactness, elogation and direction.

Step 2: Threshold the image: Note that the image can be read into a matrix n× m (n is image height, m is image width). Each cell of the matrix can have value (the range is from 0-255 (8 bits gray image) or from 0-65,536 (16 bits grayscale image) or other range when the image is in color), R, G, B. These values can have for different spectrum/image band. Threshold the image can be calculated by accessing each image cell and re-range into 0 or 1 (binary threshold) if cell value is less than or more than a threshold. After this step, the object cell values can be in the same value. The object contours cells can have at least one neighbor cell with have different value with the object cell value.

Step 3: Detecting the object: How to detect 4 directional boundaries. Choose 4 directional or 8 directional boundary. In this method, the solution for 4 directional boundaries is provided. The first boundary point can be searched from left-right and the top-down direction. And then the boundary is detected written in a chain algorithm.

Calculate area: Object area is the number of pixels in the object. Object area can be calculated during detecting boundary. Calculate perimeter: Object perimeter is equal to the length of the boundary. Compactness is defined as the perimeter square divided by the area. Longest chord ($L_c$): A chord is a line connecting two boundary pixels. The longest chord can be found by examining all possible combinations. The longest perpendicular chord perpendicular to the longest chord. Eccentricity is the ratio of the longest chord to the perpendicular chord. Minimum bounding box is a rectangle containing the object, and which sides touch the object. The minimal bounding box area is an important shape measure which is approximately longest chord times the perpendicular chord. Also, Centroid is the Center of longest chord or the cross of $L_c$ and $L_p$ Image Normalization: Several fusion methods for estimating digital (DN) numbers of downscaled multispectral (MS) images are provided in the prior art. However, most of them are based on fusion of panchromatic (PAN) and MS images. For object motion mapping (OMM) application, due to a displacement of the object between PAN and MS images, integration of PAN and MS image for the fusion purposes is not applicable. Here, image normalization based on combination of different bands of MS image is used for OMM application. These combinations are based on general equation 3:

$$PAN=W_1\times R+W_2\times G+W_3\times B+W_4\times NIR+c \qquad (3)$$

where R, G, B and NIR are digital numbers in red, green, blue and near-infrared spectral bands respectively, $W_1$, $W_2$, $W_3$ and $W_4$ are weights for each of the spectral bands, c is the shift amount and PAN is digital number in PAN image. In the present system, a least square method from sampling the image is used to estimate the weights and shift in equation 3.

Different scenarios can be considered for producing simulated PAN. The preferred scenario used in the present system is as follows: The weights ($W_1$, $W_2$, $W_3$ and $W_4$) are object dependent and need to be estimated for each image and c=0.

The present system uses the following method for estimating the weights and then producing the synthesized PAN image:
  a. The method for calculating the weights comprises of steps of:
    1—reading both the PAN and the MS images;
    2—extracting spatial resolutions in both the MS and the PAN images;
    3—asking the user to define blue, green, red and NIR bands for a MS image;
    4—resampling the MS image to the resolution of PAN image using a Cubic Convolution, bilinear or nearest neighbour resampling method;

5—calculating the total number of pixels in the MS image, N;
sample size and step to take sample values $$x = \frac{N * \text{sampling percentage}}{100} \text{ and step} = \frac{100}{\text{sampling percentage}}$$

extract digital number values from PAN and resampled MS image Read x values from PAN and from 4 bands of resampled MS (use step to read the values in image at step jump)
B is the sample from PAN, is a vector of digital number values extracted from PAN $$B = [p_1 \, p_2 \ldots p_x]$$

where $p_i$ are digital values from PAN.
A is a matrix of digital values of MS images in four bands (blue, green, red and NIR).

$$A = \begin{bmatrix} b_1 & g_1 & r_1 & nir_1 \\ b_2 & g_2 & r_2 & nir_2 \\ \ldots & \ldots & \ldots & \ldots \\ b_x & g_x & r_x & nir_x \end{bmatrix}$$

where $b_i$, $g_i$, $r_i$ and $nir_i$ are digital values from MS Blue, Green, red and NIR bands respectively.
6—using a least square method to calculate the weights, B=AW, where W=(A' A)$^{-1}$(A'B) and W is the weight matrix, B is a vector of DN values of PAN image and A is a matrix of DN values of MS images in four bands (blue, green, red and NIR). For example if the method extract 100 points, then B is a vector of 100×1 and A is matrix of 100×4.
b. Producing Simulated PAN:
7—Using the weights that are calculated above and also the MS image, calculate the DN values for Simulated PAN as follows:

$$DN_{Synthesized\ PAN} = W_1 DN_{blue} + W_2 DN_{green} + W_3 DN_{red} + W_4 DN_{NIR}$$

$W_1$ $W_2$, $W_3$ and $W_4$ are object dependent and will vary from scene to scene and therefore dynamic regression model is applied to each image used.

Clip Image: Using the centroid and pre-define buffer size the SPI and OPI are clipped for segmentation and image matching. The output image is square with edges length 2× clip buffer size. If the distance from seed point to border is less than clip buffer size, the clip is shifted inside of the larger image.

Image Matching: Image Matching Using Multi-Scale Maximum Cross Correlation Method: The image matching (i.e., locating the moved pixels) is performed by implementing the multi-scale maximum cross correlation (MMCC) method. As the acquisition time of multispectral imagery always slightly lags behind that of panchromatic imagery, it is reasonable to measure the displacement (e.g., trajectory and velocity) of target objects (e.g., ships) by comparing their original and moved locations from panchromatic and multispectral imagery, respectively. Given the pixels of a target object from original panchromatic imagery (OPI), the most similar pixels are identified by MMCC as the corresponding moved pixels from synthesized panchromatic imagery (SPI, derived from multispectral imagery). The present method identifies the corresponding pixels from SPI by quantifying the local similarity (i.e., window around a given pixel) to OPI because it is hypothesized that the same pixels of the SPI and OPI should have the maximum local similarity in a specific size of pixel window.

Methodology: This method consists of three main components: (1) MMCC Implementation: Implement the MMCC method in a single window for a single pixel. (2) Multi-Scale MMCC Implementation in multiple windows for a single pixel. (3) Multiple Pixels MS MMCC: to implement the MMCC method in multiple windows for multiple pixels.

MMCC Implementation: Step 1: Given a pixel of a target object from the subset OPI (X, Y), first create a fixed pixel window on the OPI ($W_{OPI}$) with the odd number of size in pixel (e.g., 9×9, 11×11, 13×13 . . . ). The window center pixel is aligned on the given target pixel. If no space is available to locate a specific size of pixel window on the subset OPI (i.e., this window is beyond the OPI boundary), the corresponding pixel will be assigned as (−1, −1) and not be considered as the candidates. Step 2: Centered on the pixel with the same location (column, row) as the OPI, the method subsets the SPI into 81×81 pixels. In users interface, this subset size can be adjusted. The subset size should be large enough to contain the given pixel the OPI and SPI plus some surround area. It is assumed that the corresponding pixel can be detected from the SPI within this size of subset because it is not able to move out during the short period (i.e., time difference between the OPI and SPI). On the other hand, the computation efficiency will be dramatically reduced when increasing the subset size. This method can operate even though the subset is beyond the SPI boundary because it can locate the corresponding pixel from the remaining part of this subset inside the SPI boundary. Step 3: Within the SPI subset, the method moves a pixel window with the same size as $W_{OPI}$, namely $W_{SPIj}$, by the step of one pixel from its top left to bottom right. Step 4: For each $W_{SPIj}$, the correlation coefficient of the pixel values in the $W_{SPIj}$ and $W_{OPI}$ are calculated, as denoted by:

$$CC(SPI_j \rightarrow OPI) = \frac{\sum_{i=1}^{n}(x_i - \bar{x})(y_i - \bar{y})}{\sqrt{\sum_{i=1}^{n}(x_i - \bar{x})^2} \times \sqrt{\sum_{i=1}^{n}(y_i - \bar{y})^2}}$$

where n is the number of the pixels in the moving window, while $x_i$ and $y_i$ respectively represent the pixel value (i.e., DN) in the $W_{SPIj}$ and $W_{OPI}$. In addition, $\bar{x}$ and $\bar{y}$ are the mean DN values of the pixels within the $W_{SPIj}$ and $W_{OPI}$, respectively. The correlation coefficient is ranging between −1 and 1 while the higher value indicates the stronger positive relationship between the pixel values in the $W_{SPIj}$ and $W_{OPI}$. In the MMCC method, only the maximum correlation coefficient, that is, the value close to 1, is of importance. However, no threshold is applied to correlation coefficient and a value such as 0.2 could be selected as long as it is the maximum. Image matching, method extracts the correlation coefficient value for each moving window within the SPI subset, and assign this value to the central pixel of each moving window. Step 5: After calculating the correlation coefficients for all the moving windows in the SPI subset, the method selects the one with the largest value of correlation coefficient (double type: 15~16 digits), moreover it identifies its center pixel as the corresponding pixel from the SPI:

$$MCC(SPI \rightarrow OPI) = \text{Maximize}[CC(SPI_j \rightarrow OPI)]$$

CC value close to 1 indicates high correlation between SPI and OPI and therefore can validate that the method correctly identified the corresponding pixel, and vice versa.

Multi-Scale MMCC Implementation: Step 1: Given a pixel, the method identifies its corresponding pixel from the SPI in different sizes of windows, and obtains its MMCC values. By default, the window size starts at 9×9 and ends at 27×27 in the program. Too small of a window size cannot provide sufficient local information for image matching, therefore, the method is set to start from 9×9. Meanwhile, the process is limited to 27 due to computational time, and would likely not contribute much more information for higher values. Step 2: Among these candidate corresponding pixels, several of them appear more than one time. From this perspective, the method regards the pixel that appears most frequently as the representative of the corresponding pixel from the SPI. Step 3: If more than one pixel appears at the same and the maximum frequency, the method selects the one with the largest value of average correlation coefficient as the representative in the program.

Multiple Pixels MS MMCC: Step 1: Obtain the parameters. Step 2: Implement the function Multi-Scale MMCC Implementation for each pixel to identify each pixel in the MS image, as illustrated in FIG. 7.

Requirements: Remote sensing data: High spatial resolution OPI and SPI (clipped) are required for image matching using the multi-scale MMCC method. Both of the panchromatic images must have exactly the same geo-reference and X/Y dimensions to achieve the multi-scale MMCC method for image matching.

Parameter settings: (i) Subset Image Size: the size of SPI subset centered on the pixel with the same location (column, row) as the given pixel (X, Y), default as 81. (ii) Max Window Size: the largest size of pixel window to locate the corresponding pixel on SPI, default as 27. (iii) pts: edge pixels derived by segmentation from OPI.

Assumptions, Considerations and Limitations: Assumptions: (i) The same pixel of the SPI and OPI should have the maximum local similarity in a specific size of pixel window so that one can detect the corresponding pixel from the SPI for a given pixel from OPI. (ii) The corresponding pixel can be detected from the SPI within a specific size of subset because it is not able to move out of the SPI during the short period (i.e., time difference between the OPI and SPI). That is the window size of 81×81 must be sufficient to contain the moving target pixel. For cars and airplanes this may need to be adjusted.

Considerations: (i) The MMCC method does not require a threshold but seeks for the pixel with the maximum correlation coefficient. Even though the maximum correlation coefficient is not that high, this pixel will be considered as the corresponding pixel. Because the MMCC method is completely objective, one cannot set up a subjective threshold to determine if the correlation coefficient is sufficiently high or low. For the implementation of each single-scale MMCC, the correlation coefficient is largely dependent upon image normalization/re-sampling, as well as the local heterogeneity around the given pixel. (ii) It is a non-trivial task to select the most appropriate size of pixel window. Specifically, too small size of pixel windows are not able to capture sufficient information of local similarity, whereas too large size of pixel windows can induce more noises and most importantly increase the computation complexity. Therefore, the present method is designed to apply the MMCC method in multiple sizes of pixel window. In other words, a series of candidate corresponding pixels are detected by adjusting the size of pixel window. In this method, the pixel window is ranged from the smallest one (i.e., 9×9) to the largest one (i.e., 27×27) by an interval of two pixels. The users can adjust the largest size of pixel window as needed but must ensure that it is not larger than the subset size of SPI. Note that it should not be set too large (e.g., 99×99), otherwise the multi-scale MMCC method would lose its advantage in terms of computation efficiency. Meanwhile, it should not be set too small (e.g., 11×11), otherwise there would be not enough number of pixel windows to generate the representative corresponding pixel (i.e., if there are only two pixel windows, there may be two different candidate corresponding pixels so it is difficult to select a representative). (iii) Moreover, the multi-scale MMCC method can deal with the extreme cases where small areas of pixels around the given pixel are spectrally homogeneous because it measures the local similarity in multiple sizes of pixel window.

The multispectral imagery must be resampled to the same spatial resolution of OPI as SPI, however, there may be insufficient detailed information due to the resolution differences. Therefore, the resampled SPI may not have a representative cross-correlation for target pixel match. From this point of view, even the same pixel of a target object may not have a very high value of correlation coefficient, thus can cause some cases of misidentified corresponding pixels. This dependent on the quality of SPI created from the OPI using the image normalization process.

Velocity Calculation Using Multiple Target Pixels: The method is designed for calculating the speed and trajectory of a target ship based on multiple target pixels. The present system has two different methods to achieve this objective: (i) Scalar-based and (ii) vector-based speed/trajectory calculation. Specifically, the scalar-based method takes the ship direction into account, which restrains the candidate trajectories derived by multiple target pixels within a reasonable range determined by the ship direction then produces the output speed and trajectory. Differently, the vector-based method simply calculates the speed and trajectory of the centroid of multiple target pixels that are not moving too far away. In the source codes, the speed and trajectory are calculated firstly based on the scalar-based method. If there is no reasonable trajectory returned, then the vector-based speed/trajectory is implements.

(i) Scalar-based speed/trajectory calculation: By segmenting the original panchromatic image, five target pixels along the profile (first two are seed pixels) are identified, namely points. By image matching, the method obtains the corresponding five pixels from the synthesized panchromatic image, namely points.

Step 1: Calculate the displacement for each target pixel. First the moving displacement of each target pixel, that is, $|\overrightarrow{Disp_i}|$, is calculated.

Step 2: Eliminate the abnormal pixels which are moving too far. If $|\overrightarrow{Disp_i}|$ is larger than the threshold (i.e. mean ($|\overrightarrow{Disp_i}|$)+stdv ($|\overrightarrow{Disp_i}|$)), this target pixel is regarded as an abnormal pixel and removed from the list of target pixels.

Step 3: Identify the Centroid displacement vector (CDV, i.e., $\overrightarrow{Disp_C}$) of the centroid of target pixels. This vector describes the rough direction of ship movement.

$$\overrightarrow{Disp_C} = (X_C^{SPI} - X_C^{OPI}, Y_C^{SPI} - Y_C^{OPI})$$

where $(X_C^{OPI}, Y_C^{OPI})$ and $(X_C^{SPI}, Y_C^{SPI})$ are the image columns and rows of the centroid of target pixels derived from the original and synthesized panchromatic images, respectively. The centroid of target pixels is denoted by:

$$\begin{cases} X_C = \frac{1}{n}\sum_{i=1}^{n} X_i \\ Y_C = \frac{1}{n}\sum_{i=1}^{n} Y_i \end{cases}$$

where n is the number of target pixels. Note that $\overrightarrow{Disp_C}$, can be found if acquisition time of multispectral image (i.e., SPI) is delayed to that of panchromatic image (i.e., OPI), otherwise:

$$\overrightarrow{Disp_C}=(X_C^{OPI}-X_C^{SPI}, Y_C^{OPI}-Y_C^{SPI})$$

Figure 11:
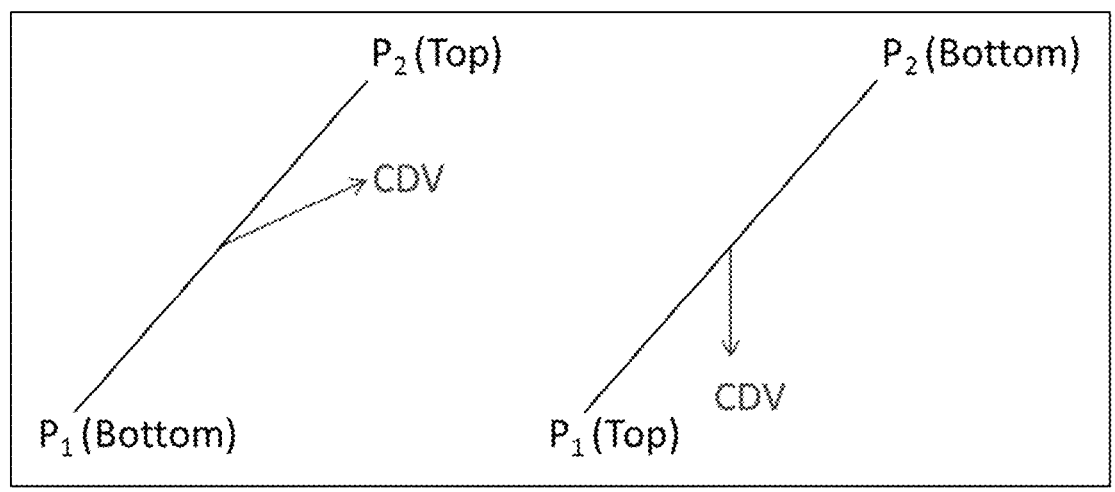
FIG. 11 illustrates determination of the direction of seed point with respect to front and back of the object.

Step 4: Determine which of the seed pixels is the ship top or bottom based on the angle (i.e., θ) between the ship vector (SV, i.e., $\overrightarrow{Ship}$) and $\overrightarrow{Disp_C}$ $$\Theta = \arccos\left(\frac{\overrightarrow{Ship} \cdot \overrightarrow{Disp_C}}{|\overrightarrow{Ship}||\overrightarrow{Disp_C}|}\right)$$

$$\overrightarrow{Ship} = (X_2 - X_1, Y_2 - Y_1)$$

where $(X_1, Y_1)$ and $(X_2, Y_2)$ represent two seed pixels: $p_1$ and $p_2$, which are also the first two target pixels. If Θ is less than 90 degree, $p_2$ is the top pixel while $p_1$ is the bottom pixel, and vice versa. Thus, the object direction vector (ODV) in this case referred to as ship direction vector, (i.e., $\overrightarrow{SD}$) is denoted as:

$$\overrightarrow{SD}=(X_{Top}-X_{Bottom}, Y_{Top}-Y_{Bottom})$$

where $(X_{Top}, Y_{Top})$ and $(X_{Bottom}, Y_{Bottom})$ represent the top and bottom pixels, respectively (see FIG. 11).

Step 5: Calculate the angle between SDV in this particular case the object is a ship, it refer to as ship displacement vector and the displacement vector of each target pixel, and then eliminate the abnormal pixels which result in the trajectories out of the range of reasonable trajectory. The angle (i.e., $\theta_i$) between $\overrightarrow{SD}$ and the displacement vector of each target pixel (i.e., $\overrightarrow{Disp_i}$) is denoted as:

$$\theta_i = \arccos\left(\frac{\overrightarrow{SD} \cdot \overrightarrow{Disp_i}}{|\overrightarrow{SD}||\overrightarrow{Disp_i}|}\right)$$

$$\overrightarrow{Disp_i} = \begin{cases} (X_i^{SPI} - X_i^{OPI}, Y_i^{SPI} - Y_i^{OPI}), & \text{if } SPI \text{ is delayed} \\ (X_i^{OPI} - X_i^{SPI}, Y_i^{OPI} - Y_i^{SPI}), & \text{if } OPI \text{ is delayed} \end{cases}$$

where i is ith pixel out of the target pixels. If $\theta_i$ is larger than the threshold (i.e. stdv($\theta_i$)), this target pixel (the blue vectors in FIG. 9B) is regard as an abnormal pixel and removed from the list of target pixels.

$$stdv(\theta_i) = \sqrt{\frac{\sum_{i=1}^{n} \theta_i}{n}}$$

Step 6: Calculate the speed and trajectory of the remaining target pixels. For each of the remaining target pixels, its speed and trajectory are calculated based on the pixel displacement:

$$speed_i = \frac{res \times |\overrightarrow{Disp_i}|}{|lag|} \times 3.6 \text{ km/h}$$

Note that the trajectory is the direction of $\overrightarrow{Disp_i}$, which is between 0 and 360 degree as compass direction.

Step 7: Select the median values of speed and trajectory from the remaining target pixels as the outputs. Among the calculated speeds and trajectories, the median values are selected as the output speed and trajectory, respectively. If the number of remaining target pixels is odd, the middle speed and trajectory are chosen from the ordered values; otherwise use the average values of the middle two speeds and trajectories.

Vector-based speed/trajectory calculation: If no appropriate target pixel is remaining within the threshold range of trajectory, then run the vector-based method. Step 1: Calculate the displacement for each target pixel. The method first calculates the moving displacement of each target pixel, that is, $|\overrightarrow{Disp_i}|$. Step 2: Eliminate the abnormal pixels which are moving too far. If $|\overrightarrow{Disp_i}|$ is larger than the threshold (i.e. mean ($|\overrightarrow{Disp_i}|$)+stdv ($|\overrightarrow{Disp_i}|$)), this target pixel is regarded as an abnormal pixel and removed from the list of target pixels. Step 3: Produce the centroid of the remaining target pixels for deriving the speed and trajectory. The centroids of the remaining target pixels are identified from the OPI and SPI, respectively. In particular, the displacement vector of this centroid (i.e., $\overrightarrow{Disp}$) is used for calculating the speed and trajectory.

$$speed = \frac{res \times |\overrightarrow{Disp}|}{|lag|} \times 3.6 \text{ km/h}$$

The trajectory is the direction of $\overrightarrow{Disp}$, which is between 0 and 360 degree as compass direction.

Length calculation: Calculate the length of target ship, i.e., $|\overrightarrow{SD}|$. Requirements: Input data: pts: target pixels derived by segmentation from OPI. npts: corresponding target pixels derived by image matching from SPI. Parameter settings. Spatial resolution can be in meters, acquisition time lag of MS relative to Pan in seconds, and threshold unit in km/h to determine whether a target ship move or not (default: 10 km/h).

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

With respect to the above description, it is to be realized that the optimum relationships for the parts of the invention in regard to size, shape, form, materials, function and manner of operation, assembly and use are deemed readily apparent and obvious to those skilled in the art, and all equivalent relationships to those illustrated in the drawings and described in the specification are intended to be encompassed by the present invention.

FIG. 12A illustrates the selection of edge pixels in the segmentation when the object is brighter than the surrounding and FIG. 12B illustrates the selection of edge pixels in the segmentation when the object is darker than the surrounding.

Figure 13:
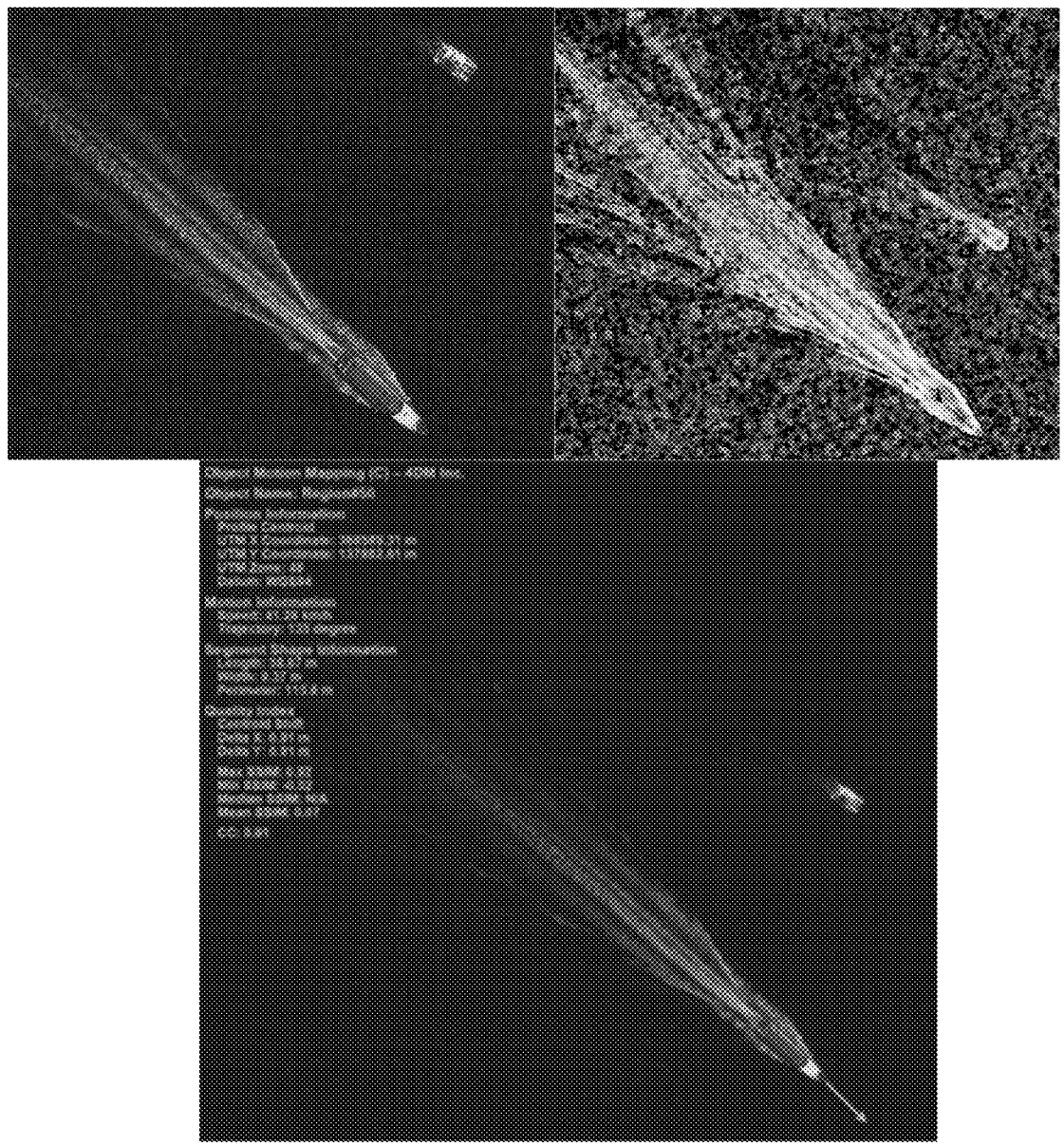
FIG. 13 illustrates OMM Output including quality flags.

For quality flag, a structural similarity index SSIM is applied to determine the image quality. A method as provided by Wang et al is used. Other parameters include centroid shift between segmented edge and seed profile line, and the cross-correlation values are shown in FIG. 13.

What is claimed is:

1. A method to extract a set of object parameters to determine an object velocity vector and physical attributes from a single-pass satellite imagery that provides a panchromatic (PAN) image and a multispectral (MS) image having a set of spectral bands and a temporal offset, said method comprising steps of:
   a) identifying two seed points, a front and a back seed points, on the PAN and the MS images at front and back of an object,
   b) performing an image registration;
   c) performing an object segmentation comprising steps of:
      using front and back seed points to obtain an object profile as a line connecting said front and said back seed points, and identifying an object centroid as being a middle point of the object profile;
      enabling a set of perpendicular profiles perpendicular to the object profile in a mesh-like structure extending across and beyond the object;
      using the set of perpendicular profiles to detect edges of the object by identifying a set of edge-pixels;
      removing a plurality of noise pixels from the set of edge-pixels;
      refining edges of the object by refining the set of edge-pixels, and
      infilling the set of edge-pixels to create a complete edge shape and a perimeter of the object;
   d) performing an image normalization to resample the multispectral image to create a Simulated Panchromatic Image (SPI) that matches the Panchromatic image (PAN), now referred to as an Original Panchromatic Image (OPI), by performing a rescaling and a dynamic regression analysis to determine a set of grey level values (DN) for creating the SPI;
   e) selecting and clipping the OPI and the SPI for an image matching;
   f) matching the OPI and a spatially displaced SPI at a coincident location of the object, and applying a point matching of a set of target pixels in the OPI to extract corresponding pixels in the SPI;
   g) determining the object velocity vector having a speed and a trajectory by obtaining a displacement of said set of target pixels, and
   h) performing an image quality testing by a set of similarity measurements performed on the object profile and the object segmentation.

2. The method of claim 1, wherein image registration is performed using a Rational Functional Model (RFM) camera model, wherein said RFM is a ratio of two cubic functions of a latitude, a longitude, and a height that provides a conjugate image coordinate.

3. The method of claim 1, wherein said set of edge-pixels are detected using a spectral intensity gradient method applied on a set of ordered pixels along each said set of perpendicular profiles, and determining a gradient for each of said set of ordered pixels, and identifying at least a pair of raw edge-pixels on each of said set of perpendicular profiles having a maximum gradient pixel and a minimum gradient pixel.

4. The method of claim 3, wherein when the object is brighter than surrounding background of the object in the MS image, a maximum gradient pixel is considered as a first raw edge-pixel and the corresponding minimum gradient pixel indicating a second raw edge-pixel, and conversely, when the object is darker than the surrounding background, a minimum gradient pixel is considered as the first raw edge-pixel, while the maximum gradient pixel suggests the second raw edge-pixel.

5. The method of claim 1, removing said plurality of noise pixels at the edges of the object by steps of:
   i) calculating a mean distance (MEAN) and a standard deviation (SD) for raw edge-pixels;
   j) if a distance of the set of edge-pixel to a closest perpendicular profile is larger than "MEAN+A×SD", wherein A is a threshold parameter, then the set of edge-pixel is considered as an outlier pixel and is removed.

6. The method of claim 5, wherein the threshold parameter A is in a range of 0.5 to 2 multiplied by the SD.

7. The method of claim 5, further using a convex hull algorithm to eliminate said plurality of noise-pixels, followed by filling and smoothing of the set of edge-pixels, thereby defining an outline and the perimeter of the object.

8. The method of claim 1, wherein said image normalization is based on a combination of the set of spectral bands of the MS image, wherein said set of spectral bands of the MS image are weighted and adjusted to obtain said SPI.

9. The method of claim 8, wherein said set of spectral bands of the MS image comprising a red, a green, a blue and a near infrared (IR) spectral bands.

10. The method of claim 1, wherein said dynamic regression analysis is based on a stepwise process to sample a set of image pixels in each of said set of spectral bands in a uniform manner across the MS image to obtain a set of weighting coefficients, w, and a shift parameter, c, to determine the SPI, and wherein said shift parameter is used for a normalize transfer function applied to the SPI derived from the set of grey level values of the OPI.

11. The method of claim 1, wherein said image normalization comprising steps of:
   a) reading both the PAN and the MS images to extract a spatial resolution, identify a number of pixels and a blue, a green, a red and a near IR spectral bands in the MS image;
   b) resampling of the MS image to the PAN image by a user selected resampling of either a cubic convolution, a bilinear or a nearest neighbor, to match said spatial resolution of the PAN image;
   c) a stepwise image sampling of each said band by using a set of image pixels and a sampling percentage to determine an image pixel sample interval to extract an array of unbiased spectral image pixels, uniformly throughout the MS and the PAN image;
   d) applying a least square method to calculate a set of weighting coefficients from the stepwise image sampling to adjust the MS image to produce the SPI from the following formula:

$$DN_{Simulated\ PAN} = W_1 DN_{blue} + W_2 DN_{green} + W_3 DN_{red} + W_4 DN_{NIR} + c$$

wherein the DNs are the grey level values of each pixel, Ws are the set of weighting coefficients, and c is a shift parameter, and wherein the weighting coefficients are adjusted uniquely for each image.

12. The method of claim 1, wherein said image matching uses a multi-scale maximum cross correlation (MMCC) method to detect the displacements of said set of target pixels in the OPI and the SPI, and wherein a maximum cross-correlation function is used to find the set of target pixels in the SPI the OPI images with the smallest error, and wherein said displacements and said temporal offset between the PAN and the MS images are used to quantify the speed and the trajectory of the object.

13. The method of claim 12, wherein the MMCC comprises steps of:
   i) creating a subset of OPI using a centroid and a series of odd number size windows with the windows centered on a pixel aligned with a selected target pixel, referred to as a Wopi;
   ii) centered on a pixel with same location as the OPI, subsetting the SPI into a series of smaller windows to form a SPI subset image and to narrow a search for a set of target pixels in the SPI;
   iii) within a SPI subset image, moving a pixel window with a size as the Wopi, namely a Wspi, one pixel at time from a first end to a second end of the MS image;
   iv) calculating a correlation coefficient of the grey level values in the Wspi and the Wopi to extract a maximum correlation value independent of any threshold;
   v) starting with a smallest window size and incrementally increasing in a window size by steps of odd numbers as defined by a user;
   vi) recording a correlation coefficient value for each moving window within the SPI subset, and assigning a value to a central pixel of each moving window;
   vii) selecting the largest value of the correlation coefficients, and identifying the target pixel in the SPI, after calculating the correlation coefficient for all moving windows in SPI subset, and
   viii) repeating steps i to vii to find the target pixels in the SPI that correspond to those in the OPI.

14. The method of claim 1, wherein the set of object parameters comprising an object boundary, an object area, the perimeter, the centroid, a longest chord, a longest perpendicular, a bounding box, a compactness, a mean and a standard deviation grey OPI values over a plurality of object areas, a mean, a maximum, a minimum and a medium spectral intensity per band of MS image of the object, a histogram and a distribution of intensity, and a unique identification number.

15. The method of claim 1, wherein each of said set of target pixels provide a displacement vector, wherein the displacement is a magnitude and the trajectory is an angle, and wherein a two-tier screening process is conducted by first applying a thresholding method to eliminate the set of target pixels that result in a set of prohibited displacements and trajectories, and wherein the best target pixel is selected from the set of target pixels having a maximum matching rate, and the displacement vector and the speed are determined, wherein the set of prohibited displacements are identified by a user.

16. The method of claim 1, wherein said object velocity vector is obtained using the displacement of said set of target pixels to determine the speed and the trajectory of the object by screening to eliminate a set of abnormal pixels for which the displacement is larger than a statistical value, and applying a scalar-based method to first determine a centroid displacement vector (CDV) of remaining target pixels of the set of target pixels in order to determine the front and the back seed points corresponding to the front and the back seed points of the object, thereby obtaining an Object Direction Vector (ODV).

17. The method of claim 16, wherein the speed and trajectory of the object velocity vector are calculated based on the scalar-based method, and vector-based speed and trajectory calculation is implemented using the object centroid to find a matching trajectory.

18. The method of claim 16, determining a displacement vector for each of remaining target pixels of the set of target pixels and using a threshold vector angle, the target pixels whose angle is larger than a user defined statistical threshold is regarded abnormal pixel and removed from a list of target pixels, and a speed and a trajectory of remaining target pixels of the set of target pixels are calculated.

19. The method of claim 1, wherein a set of quality flags are produced to provide a level of confidence in an output, wherein the set of quality flags comprise of centroid shift, image quality measure by a structural similarity index and cross correlation value.

* * * * *